UNITED STATES PATENT OFFICE.

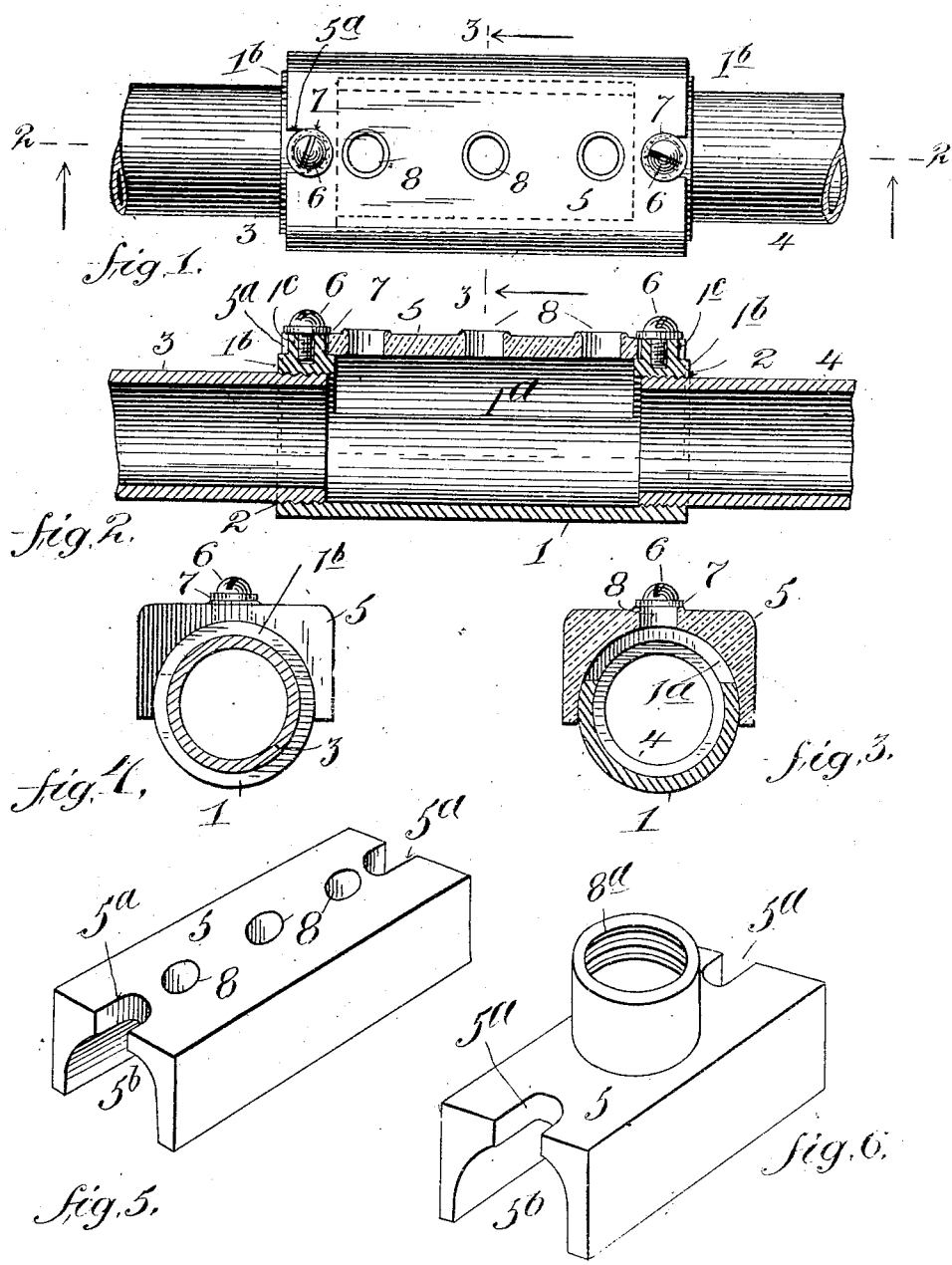

GEORGE A. LUTZ, OF NEW YORK, N. Y., ASSIGNOR TO AMERICAN CIRCULAR LOOM COMPANY, OF PORTLAND, MAINE, A CORPORATION OF MAINE.

OUTLET-BOX.

No. 898,756.   Specification of Letters Patent.   Patented Sept. 15, 1908.

Application filed January 5, 1907. Serial No. 350,864.

*To all whom it may concern:*

Be it known that I, GEORGE A. LUTZ, a citizen of the United States, and resident of New York city, borough of Brooklyn, New York, have invented certain new and useful Improvements in Outlet-Boxes, of which the following is a specification.

The object of my invention is to provide an improved outlet box or fitting adapted to be connected with pipes or conduits for electric conductors, whereby the interior of the box or fitting may be readily reached for making connection with the conductors therein, and whereby any suitable electric fitting such as rosettes, sockets, and the like may be connected with the box.

In carrying out my invention I provide a fitting in tubular form, and one part of said fitting between its ends is open on one side providing annular end portions to connect with conduits or pipes, and I provide a cap adapted to fit over and extend along the fitting or box and rest upon said annular portions, which cap is provided with apertures or other appropriate devices to permit the passage of conductors from the interior of the box or fitting, or to make connection therewith, and means are provided to detachably hold the cap upon the box.

The invention also comprises the novel details of improvement that will be more fully hereinafter set forth and then pointed out in the claims.

Reference is to be had to the accompanying drawings forming part hereof, wherein Figure 1 is a plan view of an outlet box embodying my invention, Fig. 2 is a section on the line 2, 2, in Fig. 1, Fig. 3 is a cross section on the line 3, 3, in Fig. 1, Fig. 4 is an end view, Fig. 5 is a perspective view of the cap, and Fig. 6 is a similar view showing the cap provided with a socket-outlet.

In the accompanying drawings, in which similar numerals of reference indicate corresponding parts in the several views, the numeral 1 indicates a tubular box or fitting shown provided at its ends with screw threads 2 receiving the ends of pipes or conduits 3, 4, that are adapted to contain electric conductors or wires, and on one side between its ends the box or fitting 1 is open or cut away for a suitable depth and length, at $1^a$, providing a side outlet, at the ends of which outlet the tubular box 1 has annular ring-like parts $1^b$ within which said pipes fit. At 5 is a cap of insulating material, such as porcelain, which is hollow or provided with a longitudinally disposed groove or gain, at $5^b$, curved on its inner walls to fit the ring-like parts $1^b$ and the adjacent walls of box or fitting 1, the cap thereby resting upon the ring-like parts $1^b$ and closing the opening $1^a$ of box 1, as by extending below the same. To detachably hold cap 5 upon box 1 I have shown said cap provided with recesses $5^a$ at its ends receiving studs $1^c$ on parts $1^b$ of box 1, which studs may be cast or formed integral with the box, and at 6 are screws entering threaded apertures in studs $1^c$ for detachably holding the cap upon the box. Washers 7 may be interposed between the screw heads and the studs and bear upon cap 5 for holding the same in place. The cap is thus securely attached to box 1, closes the side opening or outlet $1^a$ of the same, and may be readily detached when required. The cap 5 may have any desired number of apertures 8 for the passage of conductors from within box 1.

In Figs. 1 to 5 I have shown the cap provided with three apertures 8 for the passage of conductors, although the cap may be provided with any desired number of apertures or fittings for making electrical connections, such as sockets, rosettes and the like.

In Fig. 6 I have shown the cap provided with a tubular socket extension or outlet $8^a$ which may be made integral with the cap and may contain a usual metallic screw-threaded shell for connection with a lamp or other translating device.

By means of my improvements the caps may be provided each adapted to fit the outlet boxes and made interchangeable for the various uses intended by having them provided with the appropriate fitting, such as one or more apertures, sockets, rosettes, or the like, whereby any such cap may be readily applied to the outlet box according to the character of electrical connection to be made.

Having now described my invention what I claim is:—

1. An outlet box in tubular form provided with an opening on one side between its ends providing ring-like parts adjacent the ends of said opening, combined with a cap having a gain provided with inner surfaces corresponding to said ring like parts adapted to fit over said box and close its side opening, and means for holding said cap upon the box.

2. An outlet box in tubular form having an opening in one side providing ring-like parts adjacent the ends of said opening, combined with a cap having a gain provided with curved walls adapted to fit on the exterior of said ring-like parts and close the side opening in the box, and means for holding the cap upon the box.

3. An outlet box provided with an opening in one side and having studs near opposite ends, combined with a cap having a gain adapted to fit upon said box to close its side opening and provided with recesses to receive said studs, and screws entering threaded apertures in said studs and passing through the recesses in the cap to hold the latter upon the box.

4. An outlet box in tubular form provided with interior threads at its ends and having one side open between its ends providing ring-like parts adjacent the ends of said opening, combined with a cap having a gain provided with inner surfaces corresponding to said ring like parts adapted to fit over said box and close the side opening therein, and means for holding said cap upon the box.

5. An outlet box in tubular form having interior screw threads at its ends and provided with an opening in one side between its ends providing ring-like parts at the ends of the box adjacent the ends of said side opening, and studs projecting from said ring-like parts, combined with a cap adapted to fit over said box to close its side opening and provided with recesses to receive said studs, and means to hold the cap upon the box.

GEO. A. LUTZ.

Witnesses:
T. F. BOURNE,
L. SWINTON.